United States Patent [19]

Suzuki

[11] Patent Number: 5,828,407
[45] Date of Patent: Oct. 27, 1998

[54] METHOD OF CONTROLLING A SOLID-STATE IMAGE SENSING DEVICE AND IMAGE SENSING APPARATUS ADOPTING THE METHOD

[75] Inventor: Masao Suzuki, Toyko, Japan

[73] Assignee: Canon Kabushiki Kaisha, Tokyo, Japan

[21] Appl. No.: 670,576

[22] Filed: Jun. 26, 1996

[30] Foreign Application Priority Data

Jun. 30, 1995 [JP] Japan ..................... 7-165930

[51] Int. Cl.⁶ ................... H04N 5/335; H04N 5/238
[52] U.S. Cl. .................. 348/312; 348/279; 348/296; 348/317; 348/363
[58] Field of Search ................. 348/311, 312, 348/314, 322, 317, 296, 297, 298, 299; 257/242; H04N 5/335, 5/235

[56] References Cited

U.S. PATENT DOCUMENTS

| | | | |
|---|---|---|---|
| 4,821,105 | 4/1989 | Suga et al. | 348/314 |
| 4,989,095 | 1/1991 | Whitesel | 348/314 |
| 5,353,057 | 10/1994 | Watanabe | 348/322 |
| 5,416,517 | 5/1995 | Tani et al. | 348/249 |
| 5,442,396 | 8/1995 | Nakashiba | 348/322 |
| 5,471,242 | 11/1995 | Kondo | 348/224 |
| 5,719,625 | 2/1998 | Tani | 348/241 |

FOREIGN PATENT DOCUMENTS

| | | |
|---|---|---|
| 0689346 | 12/1995 | European Pat. Off. . |
| 8-09263 | 1/1996 | Japan . |

*Primary Examiner*—Andrew I. Faile
*Assistant Examiner*—Gene N. Auduong
*Attorney, Agent, or Firm*—Fitzpatrick, Cella, Harper & Scinto

[57] ABSTRACT

In a method of controlling an image sensing device which can be operated in two different modes, namely a field mode and a frame mode, in a frame mode, a potential of a substrate of the image sensing device and an intermediate voltage of pulses to be applied to a vertical transfer unit are set to potentials which are lower than those in the field mode, first. Then, by changing the potential of the substrate and the intermediate voltage to the same potentials as in the field mode during reading out the first field of the image sensing device, a dynamic range which is as wide as that in the field mode and a charge transfer efficiency which is as well as that achieved in the field mode are realized.

25 Claims, 15 Drawing Sheets

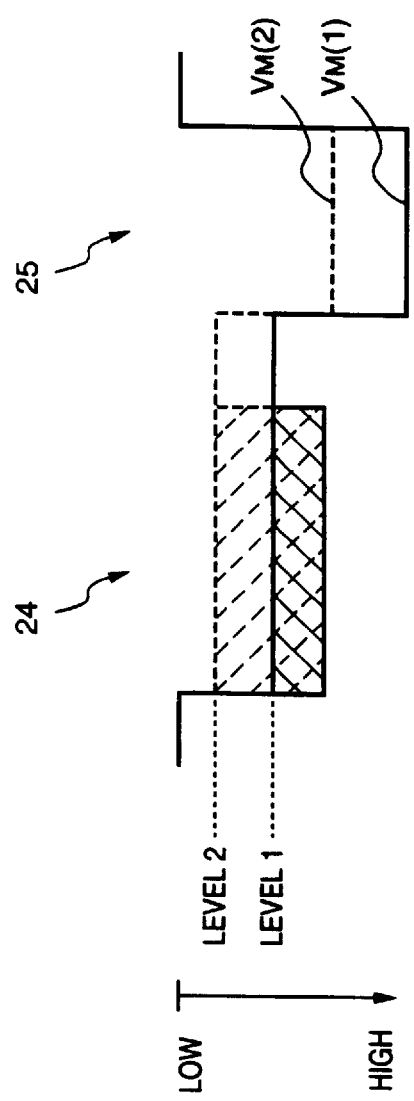

METHOD OF CONTROLLING A SOLID-STATE IMAGE SENSING DEVICE AND IMAGE SENSING APPARATUS ADOPTING THE METHOD

BACKGROUND OF THE INVENTION

The present invention relates to a method of controlling a solid-state image sensing device, such as CCD (charge coupled device), and an image sensing apparatus adopting the method.

Recently, a number of video cameras and electronic cameras using CCD as a solid-state image sensing device have been developed and sold on the market. Multimedia devices call for digital image data which is not limited to a video signal. In order to meet this demand, a digital camera dealing with data which is not necessarily a video signal has been developed. A solid-state image sensing device, such as CCD, used in such the digital camera can be designed relatively more freely because the data to be dealt with is not limited to a video signal. However, in order to keep the price of an image sensing apparatus low, it is preferable to use an image sensing device which is designed for a video camera. Accordingly, to obtain image data of high quality, there is a proposal to use an image sensing device, designed for a video camera, in a digital camera and to drive the image sensing device differently from the way it is used in the video camera.

FIG. 11A shows a brief configuration of an inter-line type CCD as a general CCD for a video camera. Photoelectric converter 20 has a plurality of arranged photoelectric converting elements (pixels) 24, each of which is covered with a complementary color filter chip. Complementary color filter chips are arranged on the photoelectric converter 20 in such a manner that a set of four colors appear repeatedly in the vertical direction with respect to the scanning direction of the CCD and each set of four adjacent pixels (2×2 pixel area) contains four different colors. This photoelectric converter 20 converts light which is in four different wavelength ranges into electrical charges. Reference numeral 21 denotes a vertical charge coupled device (VCCD), and it transfers electrical charges, stored in the pixels 24, in the vertical direction with respect to the scanning direction of the CCD when it is applied with four pulses, or charge transfer pulses, $V_1 \sim V_4$ at transfer gate electrodes 25. Further, reference numeral 22 denotes a horizontal charge coupled device (HCCD) which transfers the electrical charges transferred from the VCCD 21 in the horizontal direction, namely in the scanning direction. An output amplifier 23 converts the electrical charges transferred from the HCCD 22 into voltage signals and outputs them.

Typically, image signals are read in the following two modes in CCD. One is a field mode, in which data is read out from CCD as shown in FIG. 11B. More specifically, all the lines are scanned in each field period (a predetermined time period between read-out pulses which will be explained later), and electrical charges stored in two adjoining pixels in the vertical direction with respect to the scanning direction are added in the VCCD 21 by two neighboring lines, one of which is in an odd-field and the other in an even-field, and the added charges are read out as of a single scanning line.

The other is a frame mode, in which charges are read out from CCD in such a manner as shown in FIG. 11C. In the frame mode, electrical charges stored in pixels in every other lines are read out by interlace scanning in each field period.

FIG. 12 is a timing chart of the four charge transfer pulses $V_1 \sim V_4$ to be applied to the transfer gate electrodes 25 shown in FIG. 11A. Referring to FIG. 12, charges are transferred as the four charge transfer pulses $V_1 \sim V_4$ repeatedly change their voltages between an intermediate voltage $V_M$ and a low voltage $V_L$ which is lower than the intermediate voltage $V_M$. Then, when the charge transfer pulse $V_1$ and the charge transfer pulse $V_3$ become a high voltage $V_H$ (i.e., read-out pulse) which is higher than the intermediate voltage $V_M$ at the same time, then the electrical charges stored in the pixels 24 (Mg and G) in the odd-numbered lines and those stored in the pixels 24 (Cy and Ye) in the even-numbered lines are read out to the VCCD 21. Thereafter, the charge transfer pulses $V_1$ and $V_3$ become the high voltage $V_H$ at the same time in one field period (1FP), thus the electrical charges stored in all the pixels 24 are read out to the VCCD 21. In this field mode, electrical charges stored in the adjoining pixels in the vertical direction with respect to the scanning direction of the CCD are added, thus the resolution of the obtained image in the vertical direction becomes as bad as a half resolution in the frame mode.

FIG. 13 is a timing chart of the four charge transfer pulses $V_1 \sim V_4$ to be applied to the transfer gate electrodes 25 shown in FIG. 11A. Referring to FIG. 13, charges are transferred as the four charge transfer pulses $V_1 \sim V_4$ repeatedly change their voltages between the intermediate voltage $V_M$ and the low voltage $V_L$. Then, when the charge transfer pulse $V_1$ becomes the high voltage $V_H$ (i.e., read-out pulse), then the electrical charges stored in the pixels 24 (Mg and G) in the odd-numbered lines are read out to the VCCD 21. Next, after 1FP has passed, the charge transfer pulse $V_3$ becomes the high voltage $V_H$, and charges stored in the pixels 24 (Cy and Ye) in the even-numbered lines are read out to the VCCD 21. Thereafter, the charge transfer pulses $V_1$ and $V_3$ alternately become the high voltage $V_H$ in every other field period (1FP), thereby the electrical charges stored in all the pixels 24 are read out to the VCCD 21.

As described above, a general purpose CCD for a video camera is designed so that the capacitance of each transfer gate electrode 25 of the HCCD 21 is twice as much as the capacitance of each pixel 24. In other words, dynamic range of the CCD is designed so as to be optimum in the field mode in order that the CCD can deal with an implementation in the field mode. Thus, since the capacitance of each pixel 24 is smaller than the capacitance of each transfer gate electrode 25 of the HCCD 21, the pixel 24 is saturated before electrical charge reaches a level which can saturate the transfer gate electrode 25 of the HCCD 21 in the frame mode. Accordingly, in the frame mode, the maximum electrical charge to be read out to the transfer gate electrode 25 is smaller comparing to the field mode. When a still image is sensed by using such the CCD as described above in the frame mode, since the capacitance of the HCCD 21 is not effectively used, the resulted dynamic range of the obtained image would be narrower than that in the field mode.

Thus, in the general purpose CCD, since the dynamic range of a single transfer gate electrode 25 corresponds to the dynamic range obtained as a result of total amount of charge stored in two pixels, the same dynamic range as in the field mode can not be achieved in the frame mode and, more specifically, the dynamic range in the frame mode is about half of the dynamic range in the field mode. Therefore, in an electronic camera which reads charges and stores sensed still image in the frame mode in order to realize high resolution in the vertical direction, the quality of the image is not satisfactory because of the narrow dynamic range. For example, when an image which includes an object of high luminance is sensed with this camera, some pixels may be saturated and the color of these parts may change, or contrast of colors and luminances in the high luminance part of the image would be gone.

CCD capable of reading every pixel without adding electrical charges stored in it in each field period has been developed recently. In this type of CCD, since electric charges stored in the adjoining pixels are not added together and every pixel is read out in every field period, there would be no such problems that the resolution in the vertical direction drops or the dynamic range narrows. However, because this kind of CCD is quite expensive, it can not be used to manufacture an inexpensive image sensing apparatus.

Meanwhile, the main current of realizing high sensitivity and wide dynamic range of CCD is to adopt a vertical overflow drain (VOD) structure which can drain needless electrical charge stored in a pixel into a silicon substrate. A principle of draining a needless electrical charge stored in a pixel into a silicon substrate in the VOD structure will be explained with reference to a potential diagram of one of the pixels 24 in the depth direction shown in FIG. 14.

In FIG. 14, the horizontal axis shows depth in the substrate (deeper to the right) and the vertical axis shows potential (smaller to the top). An electrical charge generated in the pixel 24 in response to light incoming toward a photosensing surface of the CCD is stored inside of a potential wall which is determined by a voltage $V_{sub}$ which is applied at the bottom of the silicon substrate. As the voltage (or potential) $V_{sub}$ of the silicon substrate (referred as "substrate potential $V_{sub}$", hereinafter) becomes higher, the level of the potential wall becomes lower (level 1). Whereas, as the substrate potential $V_{sub}$ becomes lower, the level of the potential wall becomes higher (level 2). Therefore, by changing the substrate potential $V_{sub}$ from $V_{sub}(2)$ to $V_{sub}(1)$, it is possible to drain needless electrical charges into the silicon substrate. Further, it is possible to apply the VOD structure to an electronic shutter which controls the substrate potential $V_{sub}$ whether to store electrical charge or not.

Then, paying attention to the fact that the capacitance of a pixel changes in accordance with the value of the substrate potential $V_{sub}$, the substrate potential $V_{sub}$ in the frame mode is set lower than that in the field mode, thereby it is possible to increase the capacitance of a pixel in the frame mode as well as widen the dynamic range of the CCD. In other words, by changing the substrate potential which was $V_{sub}(1)$ in the field mode to $V_{sub}(2)$ in the frame mode (where $V_{sub}(1)>V_{sub}(2)$) (or, raise the potential wall), the maximum electrical charge which can be stored inside of the potential wall increases and the dynamic range widens. Accordingly, the charge saturation level of the pixels 24 of the photoelectric converter 20 and the same of the transfer gate electrode 25 of the VCCD 21 become well balanced, and the dynamic range of the CCD can be improved as a total effect.

However, in a case where the substrate potential in the frame mode is set lower than that in the field mode in order to increase the capacitance of a pixel, when an object of high luminance is sensed, electrical charge stored in a pixel 24 corresponding to the luminance object may flow into the VCCD 21 even during a charge collecting period, which results in some problems, such as blooming.

In order to solve this problem, the present assignee has proposed an invention in which not only the substrate potential $V_{sub}$ but also the intermediate voltage $V_M$ of the charge transfer pulses $V_1$ to $V_4$ to be applied on the transfer gate electrodes 25 can be changed between the frame mode and the field mode, and the middle voltage $V_M$ in the frame mode is set lower than that in the field mode. Thereby, the capacitance of the pixels 24 is expanded as well as the electrical charges are prevented from flowing into the VCCD 21 during undesirable periods. This invention is described in Japanese Patent Application Laid-Open No. 08-009263, applied on Jun. 20, 1994. This method will be described briefly with reference to FIG. 15.

FIG. 15 is a potential diagram of the photoelectric converter 20 and the VCCD 21 of the CCD which is as shown in FIG. 11A in the horizontal direction. In FIG. 15, the intermediate voltage $V_M$ of the charge transfer pulses $V_1$ to $V_4$ in the frame mode is set to $V_M(2)$, and the intermediate voltage $V_M$ of the charge transfer pulses $V_1$ to $V_4$ in the field mode is set to $V_M(1)$ ($V_M(1)>V_M(2)$). By setting the intermediate voltage $V_M$ as above in each mode, the potential wall between the photoelectric converter 20 and the VCCD 21 becomes higher in the frame mode than in the field mode. Therefore, because the level of the potential wall in the frame mode (level 2) is higher than the level the potential wall in the field mode (level 1), it is possible to prevent electrical charges stored in pixels from flowing into the VCCD 21 even when the substrate potential $V_{sub}$ is changed in the frame mode as described above. Consequently, problems, such as blooming, can be prevented.

However, in a case where the intermediate voltage $V_M$ of the charge transfer pulses $V_1$ to $V_4$ and the substrate potential $V_{sub}$ are set lower in the frame mode than in the field mode, the potential difference between the intermediate voltage $V_M$ and the low voltage $V_L$ become small. As a result, charge transfer efficiency in the VCCD 21 in the frame mode drops. Accordingly, there is a problem in which quality of image is degraded because of the drop of the charge transfer efficiency.

Further, there is an idea to prevent the drop of the charge transfer efficiency of the VCCD 21 by lowering not only the intermediate voltage $V_M$ but also the low voltage $V_L$ of the charge transfer pulses $V_1$ to $V_4$ in the frame mode than in the field mode. In this case, however, the circuit for changing and setting these voltages (potentials) becomes large, which causes a problem in which it is impossible to manufacture a compact image sensing apparatus at low cost. In addition, since the lowest potential of the low voltage $V_L$ has to be set, a new image sensing element needs to be designed, in which case, an inexpensive general purpose image sensing element can not be used.

SUMMARY OF THE INVENTION

The present invention has been made in consideration of the above situation, and has as its object to provide a method of controlling a solid-state image sensing device, capable of improving dynamic range, when a still image is sensed in the frame mode, to the width as in the field mode, realizing high charge transfer efficiency, and not causing a trouble, such as blooming, as well as provide an image sensing apparatus adopting the method.

According to the present invention, the foregoing object is attained by providing a method of controlling an image sensing device, which includes a photoelectric converter made of a plurality of photoelectric converting elements formed on a substrate of a semiconductor, a vertical charge transfer unit for transferring charges read out from the photoelectric converter in a single direction by applying pulses having high potential, intermediate potential, and low potential, where the high potential is higher than the low potential and the intermediate potential is in between the high potential and the low potential, and a horizontal charge transfer unit for transferring charges sent from the vertical charge transfer unit in the direction perpendicular to the charge transfer direction of the vertical charge transfer unit, and which can be operated in a field mode in that image signals are obtained after adding charges stored in pixels by two adjoining lines and in a frame mode in that image signals are obtained by interlace scanning, by controlling a potential of a substrate and the intermediate potential of the pulses when the image sensing device is scanned in the frame mode, the method comprising: a setting step of setting the potential of the substrate to a first potential and the intermediate potential to a second potential; a first changing step of changing the intermediate potential to a third potential which is higher than the second potential during reading a first field of the image sensing device; a second changing step of changing the potential of the substrate to a fourth potential which is higher than the first potential; and a second field read-out step of reading out charges stored in a second field and transfer them vertically after all charges read out from the first field have transferred.

Further, the foregoing object is also attained by providing an image sensing apparatus comprising: an image sensing device which can be operated in a field mode in that image signals are obtained by adding charges stored in pixels by two adjoining lines and in a frame mode in that image signals are obtained by interlace scanning, having: a photoelectric converter made of a plurality of photoelectric converting elements formed on a substrate of a semiconductor; vertical charge transfer means for transferring charges read out from the photoelectric converter in a single direction; and horizontal charge transfer means for transferring charges sent from the vertical charge transfer means in the direction perpendicular to the charge transfer direction of the vertical charge transfer means; switching means for switching between the field mode and the frame mode; pulse generation means for generating pulses having high potential, intermediate potential, and low potential to be applied to the vertical charge transfer means, where the high potential is higher than the low potential and the intermediate potential is in between the high potential and the low potential; first setting means for setting a potential of the substrate either to a first potential or to a second potential which is higher than the first potential; second setting means for setting the intermediate potential either to a third potential or to a fourth potential which is higher than the third potential; and setting switch means for issuing an instruction to change the potential of the substrate and the intermediate potential.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 15 is a potential diagram of the pixel and the transfer gate electrode of CCD in the horizontal direction.

DETAILED DESCRIPTION OF THE PREFERRED EMBODIMENTS

Preferred embodiments of the present invention will be described in detail in accordance with the accompanying drawings.

First Embodiment

Figure 1:
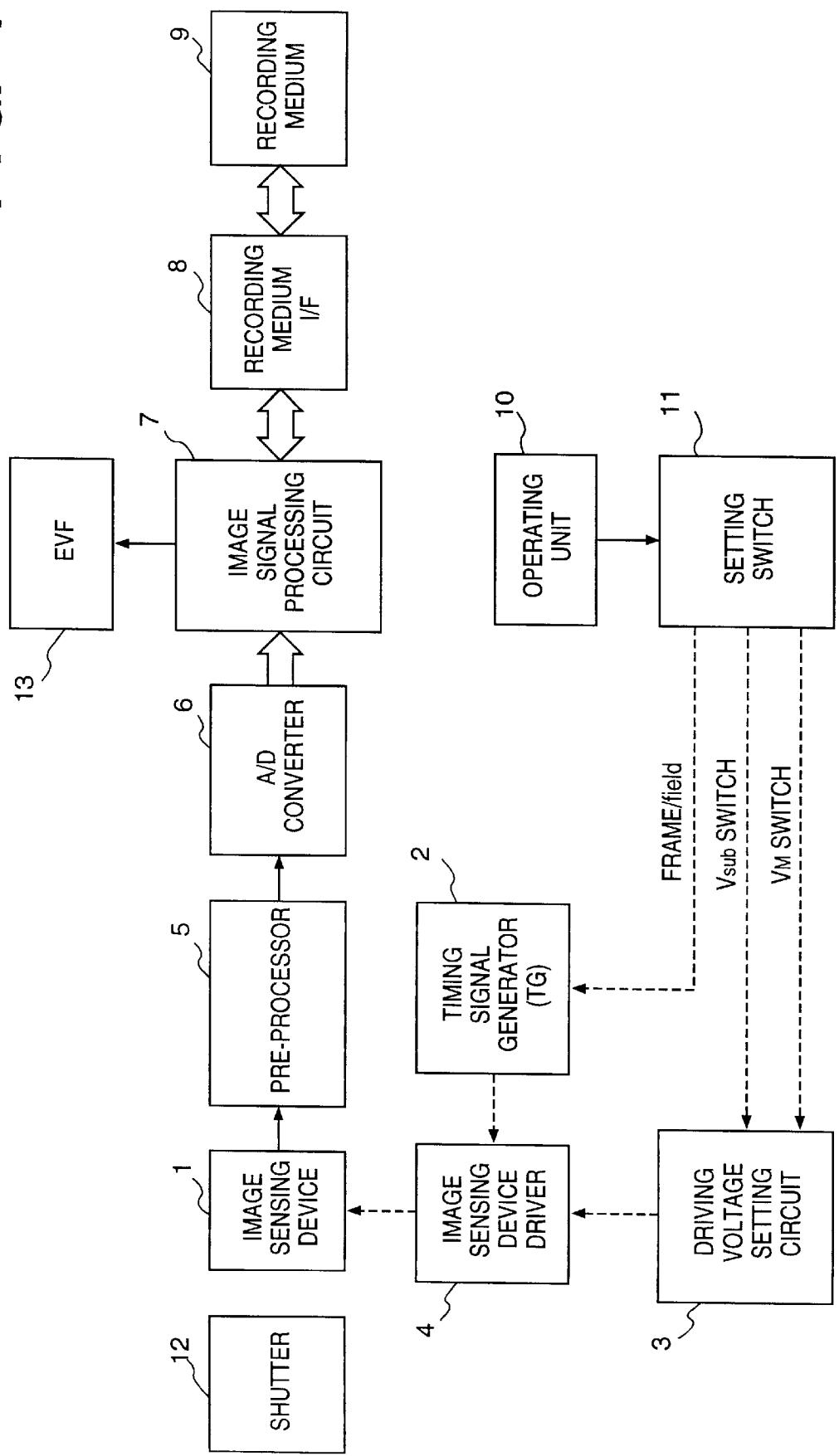
FIG. 1 is a block diagram illustrating a brief configuration of an image sensing apparatus according to a first embodiment of the present invention.
Figure 11:
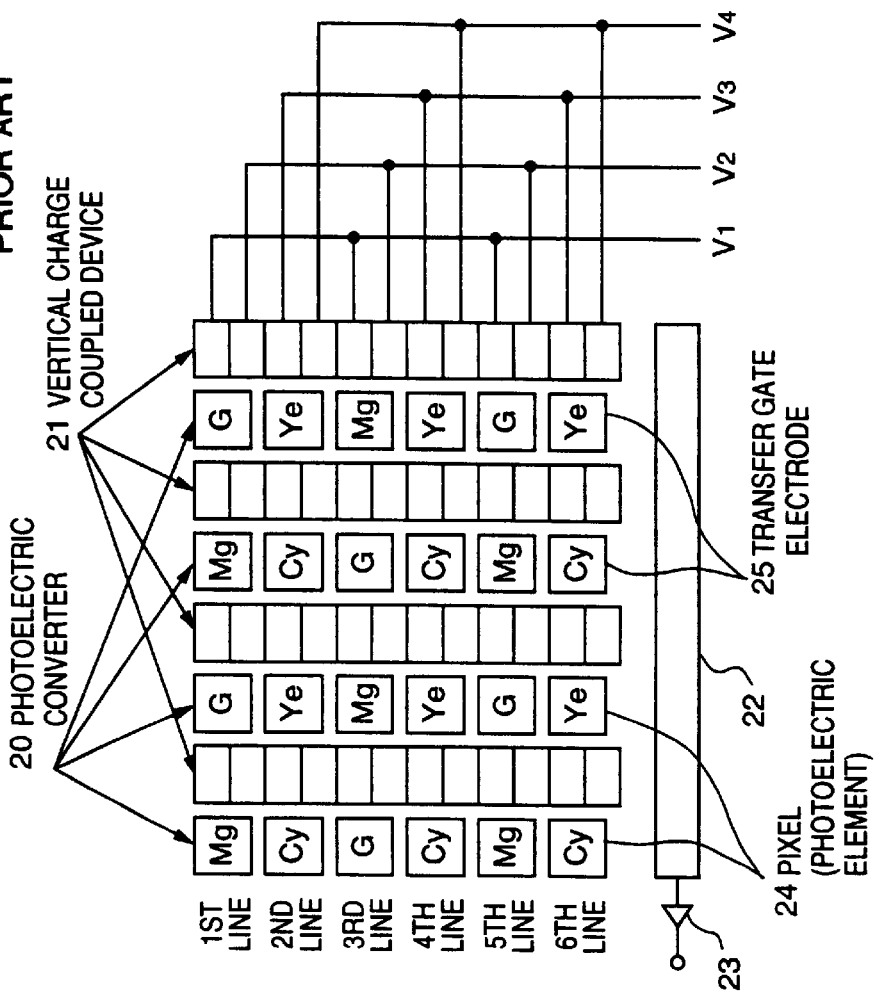
FIG. 11A depicts a brief configuration of an inter-line type CCD.
FIG. 11B is an explanatory view showing a reading pattern in a field mode.
FIG. 11C is an explanatory view showing a reading pattern in a frame mode.
Figure 12:
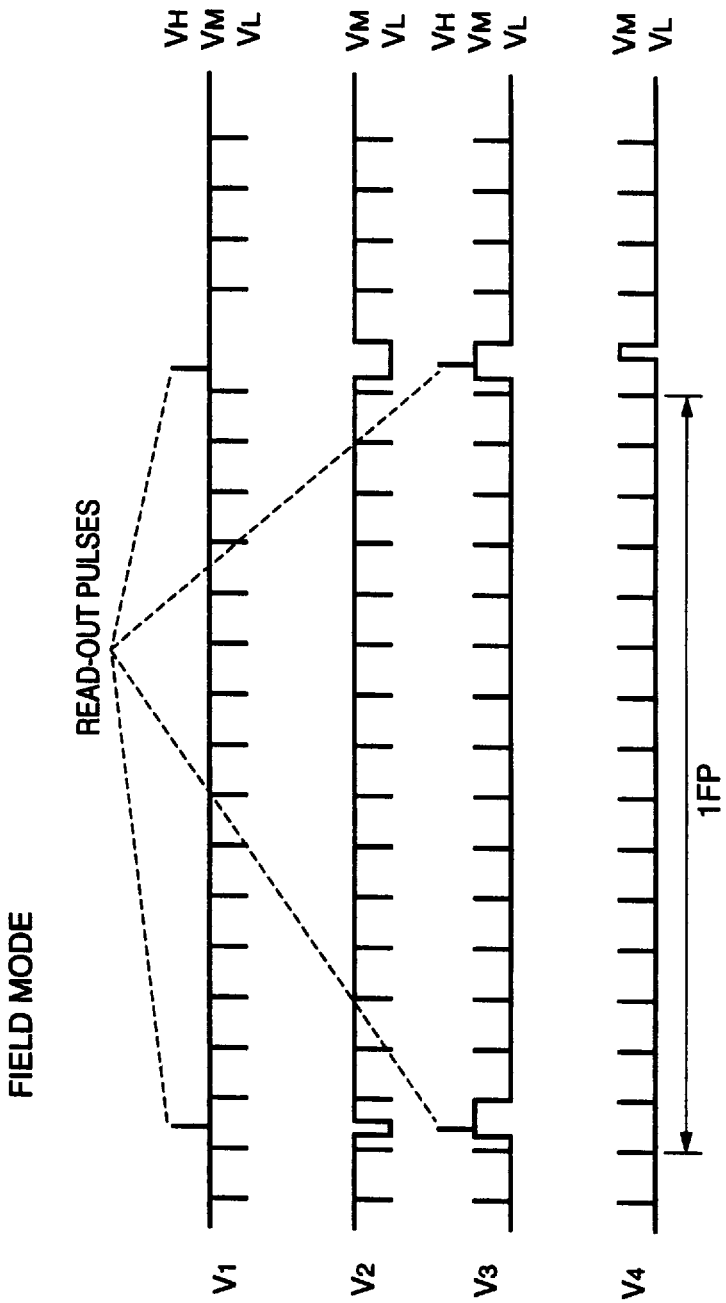
FIG. 12 is a timing chart of four charge transfer pulses $V_1$ to $V_4$ to be applied to transfer gate electrodes shown in FIG. 11 in the field mode.
Figure 13:
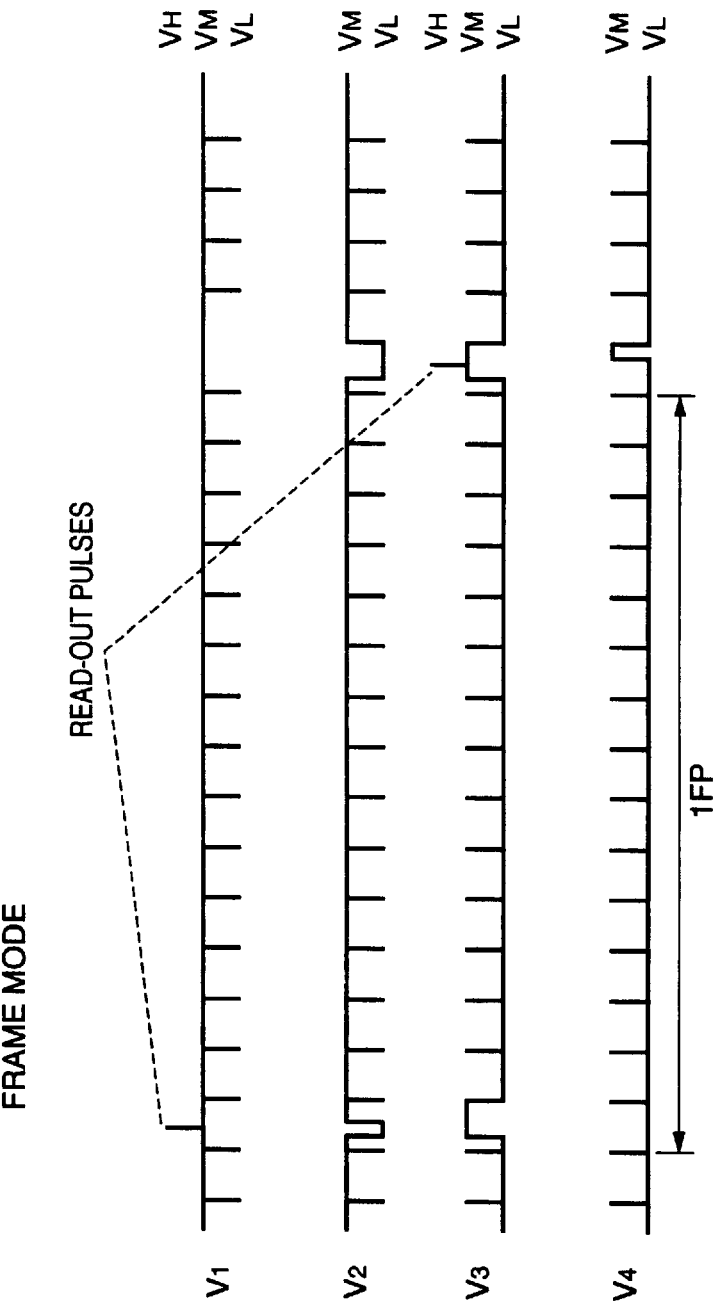
FIG. 13 is a timing chart of four charge transfer pulses $V_1$ to $V_4$ to be applied to the transfer gate electrodes shown in FIG. 11 in the frame mode.

FIG. 1 is a block diagram illustrating a configuration of a digital camera according to a first embodiment of the present invention. In FIG. 1, reference numeral 1 denotes an image sensing device which converts light from an object into electrical signals. In the embodiment, the image sensing device 1 has a configuration as shown in FIG. 11. More specifically, it is assumed that the image sensing device 1 is an inter-line type CCD on which complementary color filter chips are provided in such a manner that a set of four colors appear repeatedly in the vertical direction with respect to the scanning direction of the CCD and each set of four adjacent pixels (2×2 pixel area) contains four different colors. A timing signal generator (TG) 2 generates timing signals which are necessary for operating the image sensing device 1. A driving voltage setting circuit 3 supplies driving voltages for driving the image sensing device 1. An image sensing device driver 4 amplifies signals from the timing signal generator 2 to a level required to drive the image sensing device 1.

A pre-processor 5 includes a correlated double sampling circuit for removing output noises of the image sensing device 1 and an automatic gain controller (both are not shown). An A/D converter 6 converts analog signals outputted from the pre-processor 5 into digital signals. An image signal processing circuit 7 performs various signal processes on the digitized signals. A recording medium interface (I/F) 8 transmits image signals for recording to a recording medium 9. An operating unit 10 is for an operator to start sensing an image with the camera and to control reading modes of the image sensing device 1. Further, a setting switch 11 outputs a control signal to change a potential of a substrate (substrate potential) $V_{sub}$ and an intermediate voltage (potential) $V_M$ of charge transfer pulses $V_1 \sim V_4$, and a signal to be used for setting timing of the timing signal generator 2. A shutter 12 is a mechanical one and controls time for light to incident on the image sensing device 1. Further, an electric view finder (EVF) 13 displays image signals from the image signal processing circuit 7 on a display screen.

Figure 2:
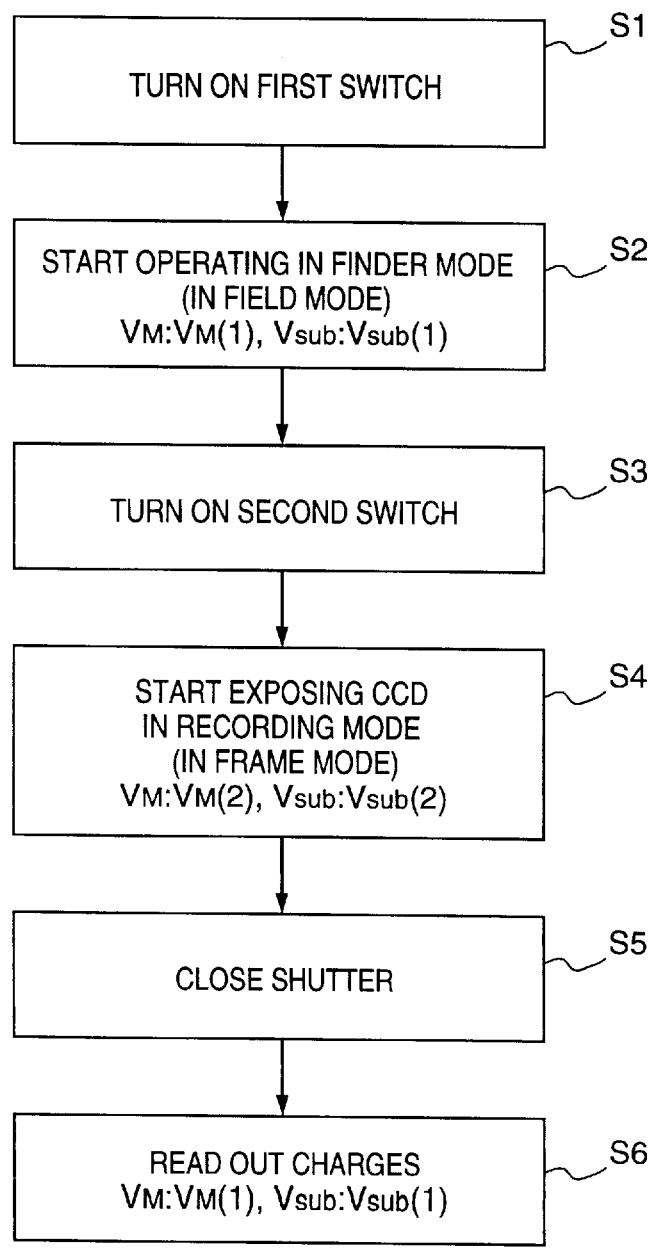
FIG. 2 is a flowchart for explaining an operation of the image sensing apparatus according to the first embodiment of the present invention.

Next, an operation of the digital camera of the first embodiment will be explained with reference to a flowchart shown in FIG. 2 which illustrates an operational sequence, FIG. 3 which shows timing of the charge transfer pulses $V_1 \sim V_4$ and other signals, and FIG. 4 which shows an enlarged picture of a part $\underline{a}$ in FIG. 3.

In the first embodiment, a finder mode for displaying an image on the EVF 13 is initiated as an operator turns on a first switch of the operating unit 10 (step S1), then an image sensing process starts in the field mode in which image signals are read out faster (step S2). In accordance with the above operation, an iris diaphragm (not shown) is controlled and the shutter 12 opens. Further, by controlling an electronic shutter of the image sensing device 1 (will be described more below) by the timing signal generator 2, exposure operation starts. The image sensing device 1 is exposed until the charge transfer pulses $V_1$ and $V_3$ become a high voltage $V_H$, which is higher than the intermediate voltage $V_M$. When the pulses (read-out pulses) having the high voltage $V_H$ are applied to the VCCD 21, added image signals are read out from the image sensing device 1 in each field period. The read-out signals are applied with signal processes, such as a correlated double sampling process and gain control process, in the pre-processor 5. Here, the gain used in the gain controller is dominated by sensitivity of the image sensing device 1, thus it is set while manufacturing the camera. The output signals from the pre-processor 5 are converted into digital signals by the A/D converter 6, and enter the image signal processing circuit 7. Then, the processed signals in the image signal processing circuit 7 are outputted to the EVF 13 as moving picture signals, so that the operator can check an image sensing area and a state of an object.

Figure 14:
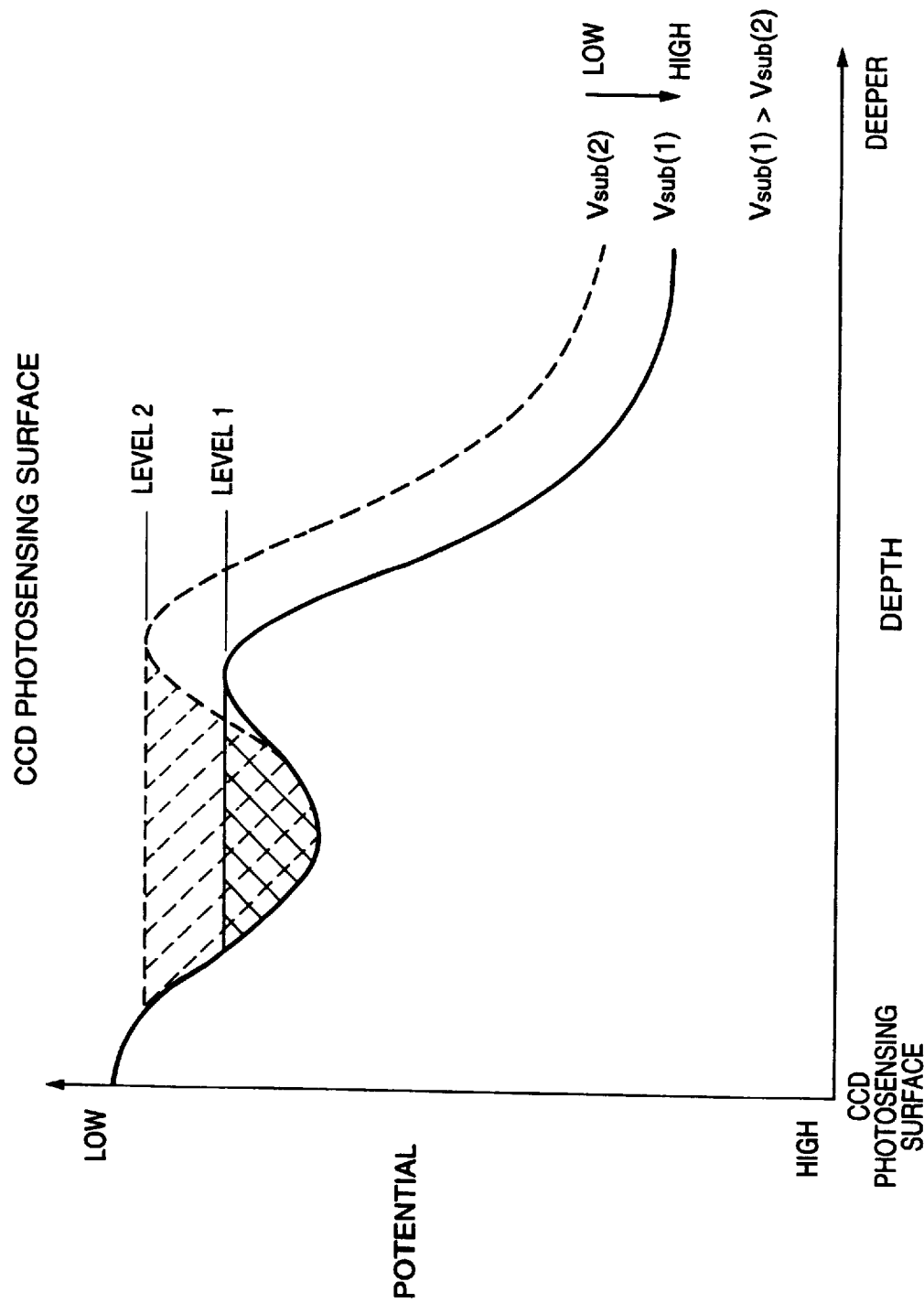
FIG. 14 is a potential diagram of a pixel of image sensing element having a vertical overflow drain structure in the depth direction of the substrate.

In the finder mode operation, since the signals are read out from the image sensor 1 in the field mode, the substrate potential $V_{sub}$ of the image sensing device 1 is set to the same value as $V_{sub}(1)$ shown in FIG. 14, as well as the intermediate voltage $V_M$ of the charge transfer pulses $V_1 \sim V_4$ is set to the same value as $V_M(1)$ shown in FIG. 15. Thereby, it is possible to optimize a dynamic range and the vertical transfer efficiency of the VCCD 21 in the finder mode.

Figure 3:
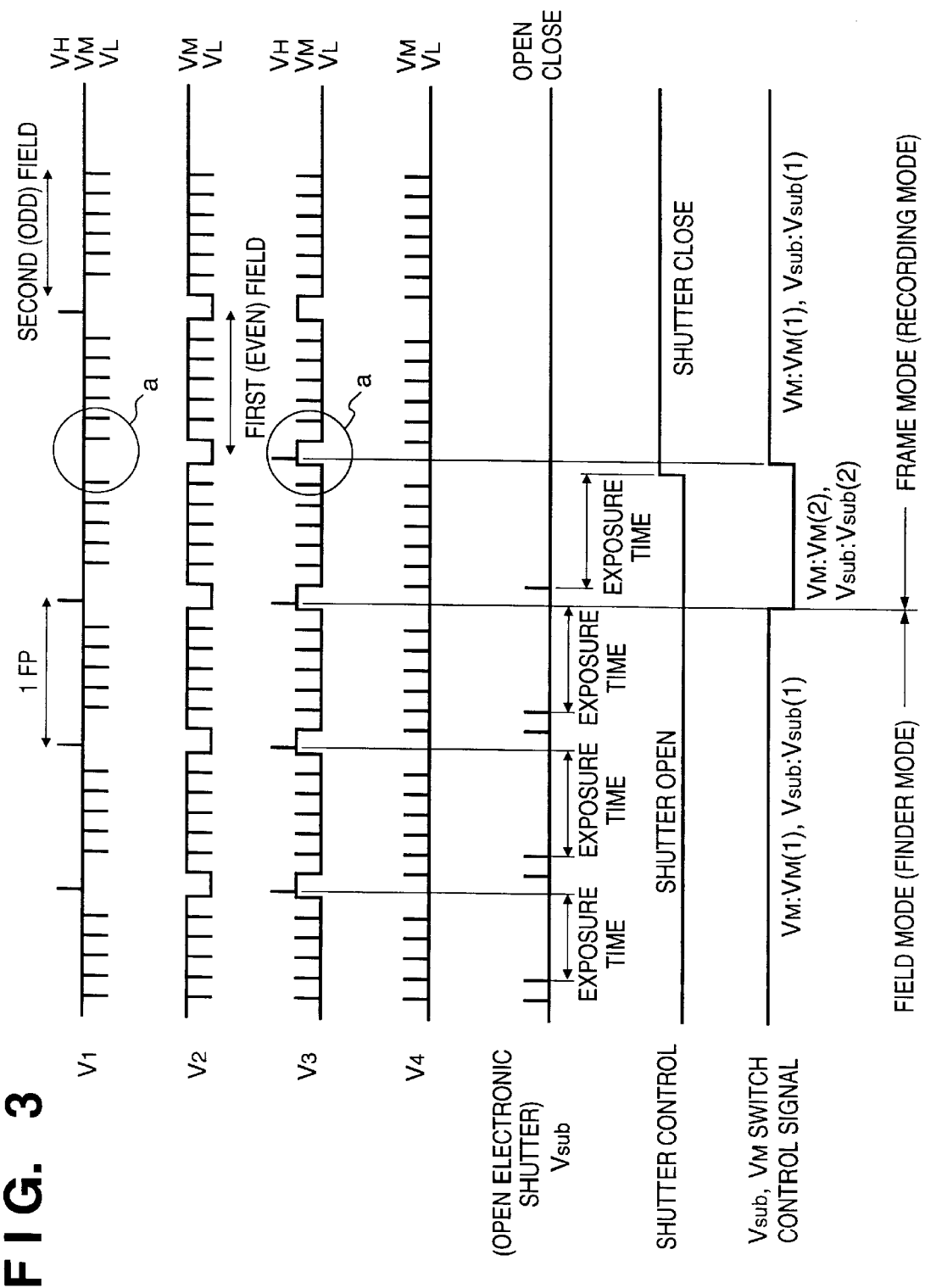
FIG. 3 is a timing chart for explaining an operation of the image sensing apparatus according to the first embodiment of the present invention.

FIG. 3 is a timing chart of the charge transfer pulses $V_1 \sim V_4$, the substrate potential $V_{sub}$ (open timing of the electronic shutter is illustrated), the control signal for controlling open and close states of the shutter 12, and a switching signal for switching the substrate potential $V_{sub}$ and the intermediate voltage $V_M$.

In the finder mode, the shutter 12 is always open, and a time period from when electrical charges stored in the pixels 24 are drained into the substrate by applying a pulse of a high voltage on the substrate to open an electronic shutter until the charge transfer pulses $V_1$ and $V_3$ become the high voltage $V_H$ is one exposure period of the image sensing device 1. The charge transfer pulses $V_1$ and $V_3$ become the high voltage $V_H$ at the almost same time once in every field period, and charges stored in all the pixels in lines are added by two adjoining lines and read out. Further, as described above, in the field mode, the substrate potential $V_{sub}$ of the image sensing device 1 is $V_{sub}(1)$, and the intermediate voltage $V_M$ of the charge transfer pulses $V_1$ and $V_3$ is $V_M(1)$.

Now, an operation of the driving voltage setting circuit 3 in the field mode will be described with reference to FIG. 5 which illustrates an equivalent circuit of a part of the driving voltage setting circuit 3. In the field mode, a control signal of LOW level is inputted from the setting switch 11 and a transistor $Tr_1$ becomes OFF. Thereby, the base potential of a transistor $Tr_2$ is dominated by a resistors $R_3$ and $R_4$, and a voltage $Vl_1$. The base potential of the transistor $Tr_2$ drops by a potential difference $V_{be}$ between the base and the emitter of the transistor $Tr_2$, and is outputted as $V_{sub}(1)$ or the intermediate voltage $V_M(1)$. Accordingly, $V_{sub}$ and $V_M$ are controlled so as to become $V_{sub}(1)$ and $V_M(1)$, respectively.

Next, a recording mode for recording a still image in the recording medium 9 is initiated as the operator turns on the second switch of the operating unit 10 (step S3), then an image sensing processing in the frame mode starts (step S4). The process in the recording mode is performed in the frame mode. First, the substrate potential $V_{sub}$ of the image sensing device 1 is set to the same value as $V_{sub}(2)$ shown in FIG. 14 as well as the intermediate voltage $V_M$ of the charge transfer pulses $V_1 \sim V_4$ is set to the same value as $V_M(2)$ shown in FIG. 15. When a pulse of a high voltage $V_H$ which is for opening the electronic shutter is applied to the substrate for the first time after the above settings, exposure to the image sensing device 1 is started. Then, the shutter 12 is closed after determined exposure period has passed (step S5), thus the exposure is completed. During exposing the image sensing device 1, since both $V_{sub}$ and $V_M$ are in the potentials which cause the level 2 states (or, $V_{sub}(2)$ and $V_M(2)$) as shown in FIGS. 14 and 15 (i.e., the potential walls are high), the maximum capacitance of the pixels 24 increases and electrical charges stored in the pixels 24 will not flow into the VCCD 21.

After the exposure, the transfer pulse $V_3$ is set to the high voltage $V_H$ so as to read out electrical charges stored in pixels (Cy, Ye) in the even-numbered lines (i.e., even field). Further, about that time (this timing will be explained later in detail with reference to FIG. 4), the substrate potential $V_{sub}$ of the image sensing device 1 is set to $V_{sub}(1)$ as well as the intermediate voltage $V_M$ of the charge transfer pulses $V_1 \sim V_4$ is set to $V_M(1)$. Thereafter, after one field period has passed since the charge transfer pulse $V_3$ is set to the high voltage $V_H$, the charge transfer pulse $V_1$ is set to the high voltage $V_H$ so as to read out electrical charges stored in pixels (Mg, G) in the odd-numbered lines (i.e., odd field) (step S6).

Here, an operation of the driving voltage setting circuit 3 in the frame mode will be described with reference to FIG. 5. Since the control signal from the setting switch 11 ($V_{sub}$ switch, $V_M$ switch) is in HIGH level in the frame mode, the transistor $Tr_1$ becomes ON, and the base potential of the transistor $Tr_2$ is dominated by the resistors $R_3$ and $R_4$, the voltage $Vl_1$, as well as the transistor $Tr_1$ and the resistor $R_2$. At this time, since a resistance between the base and the emitter of the transistor $Tr_2$ is small, the emitter potential of the transistor $Tr_2$ becomes the substrate potential $V_{sub}(2)$ or the intermediate voltage $V_M(2)$ which is smaller than the substrate potential $V_{sub}(1)$ or the intermediate voltage $V_M(1)$, respectively, and outputted from the output terminal.

Next, timing of changing the charge transfer pulse $V_3$ to the high voltage $V_H$ and timing of changing the substrate potential $V_{sub}$ and the intermediate voltage $V_M$ of the charge transfer pulses $V_1 \sim V_4$ from $V_{sub}(2)$ and $V_M(2)$ to $V_{sub}(1)$ and $V_M(1)$ are explained with reference to FIG. 4.

Figure 4:
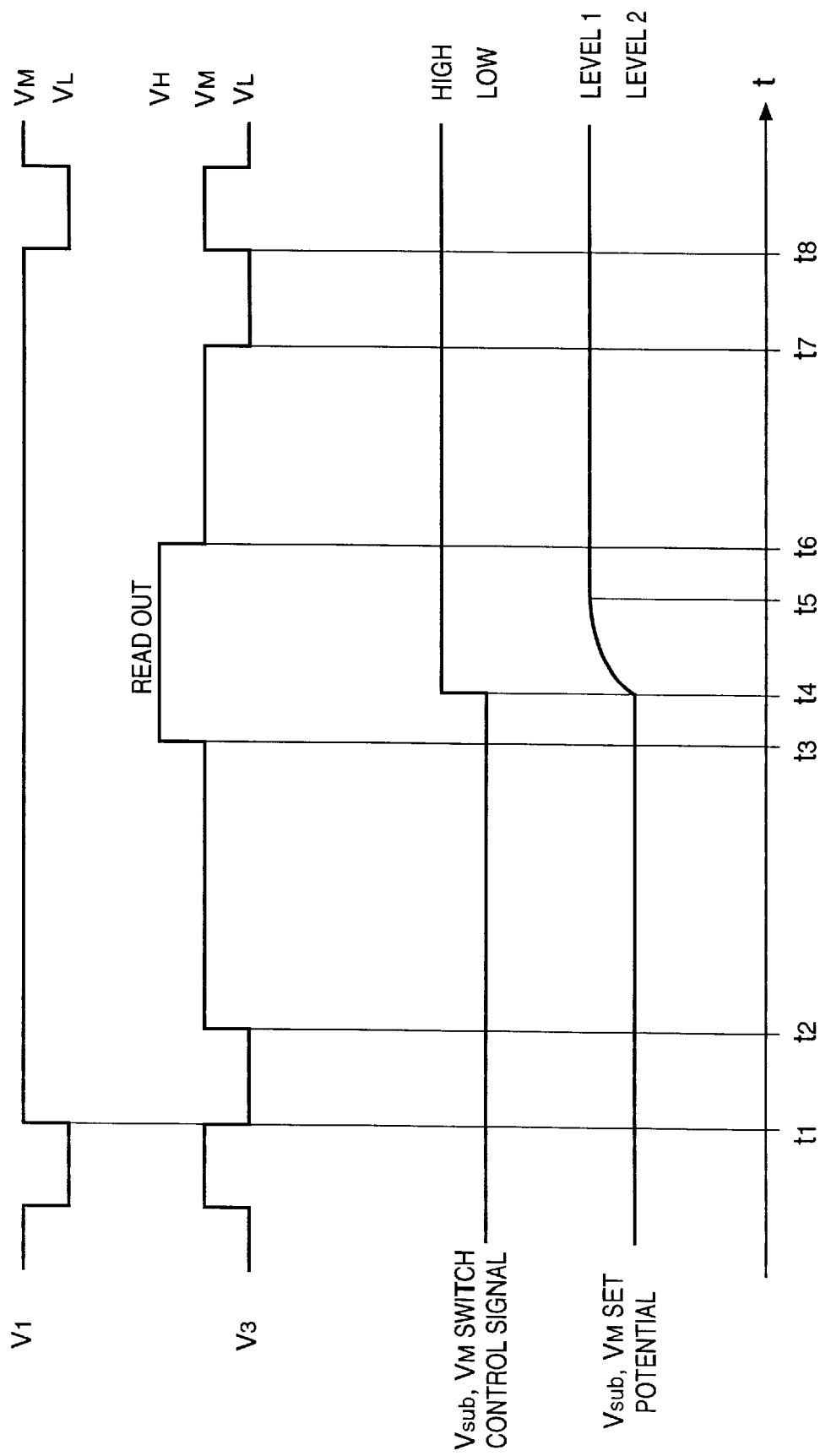
FIG. 4 is a timing chart showing a part of the timing chart shown in FIG. 3 more in detail.

FIG. 4 is a timing chart showing the charge transfer pulses $V_1$ and $V_3$ which are enlarged portions inside of circles a in FIG. 3, a switch control signal for switching the substrate potential $V_{sub}$ and the intermediate voltage $V_M$ outputted from the setting switch 11, and the substrate potential $V_{sub}$ and the intermediate voltage $V_M$.

Referring to FIG. 4, reference numeral $t_1$ denotes the time when the charge transfer operation performed in accordance with the charge transfer pulses stops just before the charge transfer pulse $V_3$ is changed to the high voltage $V_H$; $t_2$, the time when the charge transfer pulse $V_3$ is changed from the low voltage $V_L$ to the intermediate voltage $V_M$ just before the charge transfer pulse $V_3$ is changed to the high voltage $V_H$; $t_3$, the time when the charge transfer pulse $V_3$ is changed to the high voltage $V_H$; $t_4$, the time when the switch control signal is changed from LOW level to HIGH level and the substrate potential $V_{sub}$ and the intermediate voltage $V_M$ start changing; $t_5$, the time when both the substrate potential $V_{sub}$ and the intermediate voltage $V_M$ finish changing to $V_{sub}(2)$ and $V_M(2)$; $t_6$, the end of the high voltage $(V_H)$ period of the charge transfer pulse $V_3$; $t_7$, the time when the charge transfer pulse $V_3$ is changed from the intermediate voltage $V_M$ to the low potential $V_L$ after end of the high voltage $(V_H)$ period; and $t_8$, the time when charge transfer operation is started in accordance with the charge transfer pulses after the end of the high voltage $(V_H)$ period. It should be noted that, in the period between $t_1$ to $t_8$, since the voltages of the charge transfer pulses $V_1$ and $V_3$ do not change alternatively, no electrical charge is transferred in the VCCD 21.

In the digital camera of the first embodiment, at the time $t_4$ when the voltage of the charge transfer pulse $V_3$ changes to the high voltage $V_H$, the switch control signal for switching the substrate potential $V_{sub}$ and the intermediate voltage $V_M$ of the charge transfer pulses $V_1 \sim V_4$ is switched from the LOW level to the HIGH level, as shown in FIG. 4. Accordingly, both the substrate potential $V_{sub}$ and the intermediate voltage $V_M$ are changed from the level 2 to the level 1 by the time $t_5$ when the end of the high voltage $(V_H)$ period of the charge transfer pulse $V_3$. Thus, in the digital camera of the first embodiment, the intermediate voltage $V_M$ of the charge transfer pulses $V_1 \sim V_4$ is changed from the $V_M(2)$ to $V_M(1)$ which is the same as the intermediate voltage $V_M$ in the field mode during the charge transfer pulse $V_3$ is in the high voltage $V_H$ for the first time in the frame mode. Consequently, charge transfer efficiency in the frame mode does not drop. Further, the switch control signal makes the substrate potential $V_{sub}$ and the intermediate voltage $V_M$ changed from the level 2 to level 1 during the charge transfer pulse $V_3$ is in the high voltage $(V_H)$ period, thus the changing control signal should be switched from the LOW level to the HIGH level in the first half period in which the charge transfer pulse $V_3$ is in the high voltage $(V_H)$ period ($|t_3 \sim t_4| < |t_4 \sim t_5|$).

It should be noted that the intermediate voltage $V_M$ from $V_M(2)$ to $V_M(1)$ can be changed anytime during the period between t1 to t8 when electrical charges are not transferred in the VCCD 21. The reason for this is as follow.

If the intermediate voltage $V_M$ is changed to $V_M(1)$ outside of this period, since the potential wall is lowered, electrical charges may flow into the VCCD 21 from the pixels 24, and transferred. As a result of this, the electrical charges in pixels in the next lines are mixed together, which causes deterioration of an image. However, in a case where the intermediate voltage $V_M$ is set to $V_M(1)$ during the aforesaid period, even though electrical charges flow into the VCCD 21 from the pixels 24, vertical charge transfer processing is not performed, thus the flow charge does not mix with a charge in the neighboring lines. As a result, an image is not deteriorated.

Especially, as in the digital camera in the first embodiment, when the intermediate voltage $V_M$ is changed from $V_M(2)$ to $V_M(1)$ during the period when the charge transfer pulse $V_3$ is in the high voltage for the first time, it is possible to almost eliminate a chance for electrical charges to flow into the VCCD 21 from the pixels 24 in the even-numbered lines during undesired period, such as a charge transfer period and a charge storing period. Accordingly, it is possible to almost prevent an image from deteriorating because of blooming. Further, in the digital camera of the embodiment, although the intermediate voltage $V_M$ is set to $V_M(1)$, which is the same value as in the field mode, after the time $t_5$, a charge stored under the substrate potential $V_{sub}(2)$ in the frame mode before the time $t_5$ can be read out as an image signal without any waste. Therefore, the maximum capacitance of the VCCD 21 can be used as effectively as in the field mode. Consequently, the dynamic range does not become narrow substantially.

Further, by changing the intermediate voltage $V_M$ to $V_M(1)$ which is the same potential as in the field mode, it is possible to realize the same charge transfer efficiency in the frame mode as in the field mode. Furthermore, it becomes unnecessary to provide other circuit for setting potentials.

Further, in the digital camera of the first embodiment, after electrical charges stored in the pixels 24 in the even-numbered lines (i.e., Cy and Ye), which have relatively high potential level in many images, are read out by changing the charge transfer pulse $V_3$ to the high voltage $V_H$, first, then the electrical charges stored in the pixels 24 in the odd-numbered lines (i.e., G and Mg) are read out by changing the charge transfer pulse $V_1$ to the high voltage $V_H$. More specifically, among pixels corresponding to four complementary colors, the lines (even-numbered lines in the first embodiment) with the pixels 24 which are more frequently saturated comparing to other lines are read out first in the frame mode, then the lines (odd-numbered lines in the first embodiment) with the pixels 24 which are less frequently saturated. By reading out the lines of the pixels 24 in this order, when the intermediate voltage $V_M$ is changed to $V_M(1)$ at time $t_5$ which makes the potential wall formed between the pixels 24 and the VCCD 21 lower, electrical charges stored in the pixels 24, especially in the pixels (G, Mg) in the odd-numbered lines which have not read out yet, scarcely flow into the VCCD 21. Therefore, chances of deteriorating an image become very low.

Furthermore, since the substrate potential $V_{sub}$ is changed from $V_{sub}(2)$ to $V_{sub}(1)$ which is the same value as in the field mode during the period when the charge transfer pulse $V_3$ is changed to the high voltage $V_H$ for the first time after each charge transfer period is finished in the frame mode, the maximum capacitance of each pixel 24 is same as that in the conventional field mode thereafter. Accordingly, if the intermediate voltage $V_M$ is changed, electrical charges stored in the pixels 24 in the odd-numbered lines do not flow into the VCCD 21.

Note, in order to read out electrical charges with the shutter 12 open, the time when the substrate potential $V_{sub}$ is changed from $V_{sub}(2)$ to $V_{sub}(1)$ can be an interval between the time when the charge transfer pulse $V_3$ is changed to the high voltage $V_H$ for the first time after each charge transfer period is finished, and any pixel 24 reaches the saturation level. The reason for changing the substrate potential $V_{sub}$ to $V_{sub}(1)$ before any pixel 24 reaches the saturation level is to drain electrical charges stored in the pixels 24 before the saturation of the pixel 24 to prevent the excess charge, stored in the pixels 24 in the odd-numbered line, from flowing into the VCCD 21 during the charge transfer period when the intermediate voltage $V_M$ is changed to $V_M(1)$.

Furthermore, since the substrate potential $V_{sub}$ is changed to $V_{sub}(1)$ which is the same value as in the field mode, there is no need to provide other circuit for setting potential.

According to the digital still camera of the first embodiment, since the shutter 12 is closed in order to block light incoming toward the image sensing device 1 before starting reading out electrical charges from the pixels 24 by changing the charge transfer pulse $V_3$ to the high voltage $V_H$ as shown in FIG. 3, needless charges are not generated in the pixels 24 after charges are read out from the pixels 24 in the even-numbered lines, and only electrode dark current flows. Therefore, in a case where electrical charges stored in the pixels 24 in the odd-numbered lines are less than the level of the potential wall formed by $V_M(2)$ upon reading out charges from the pixels 24 in the even-numbered lines, no charge flows into the VCCD 21 while performing vertical charge transfer even though the substrate potential $V_{sub}$ is not changed to $V_{sub}(1)$. More specifically, it is possible to obtain an image of high quality in the frame mode without controlling the substrate potential $V_{sub}$.

Figure 5:
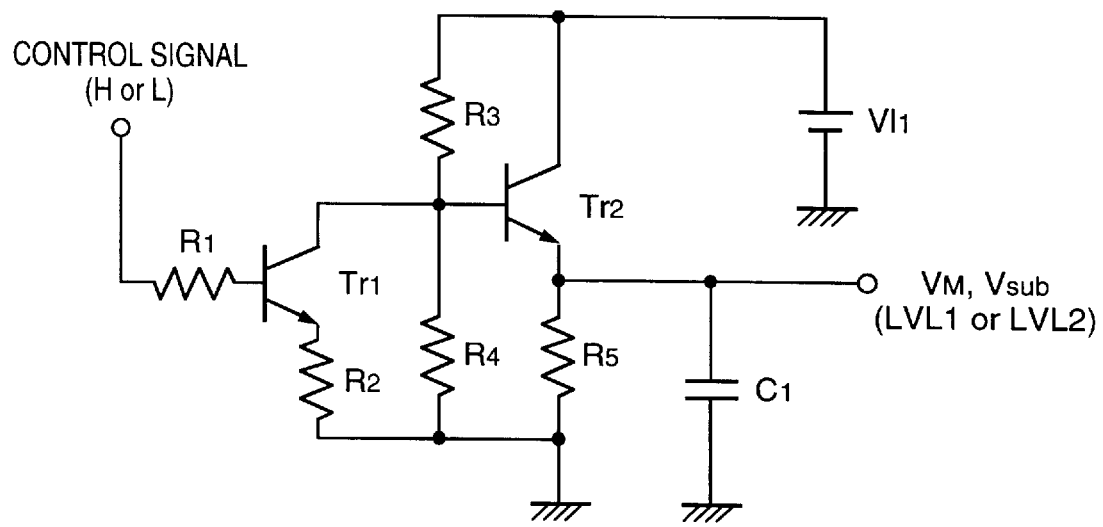
FIG. 5 is an equivalent circuit of a driving voltage setting circuit shown in FIG. 1.

As described above, upon changing the substrate potential $V_{sub}$ and the intermediate voltage $V_M$ from level 2 to level 1, the time constant of this part have to be controlled by changing the capacitance of the capacitor $C_1$ shown in FIG. 5 so that the timing of switching potentials satisfies the above-described conditions. This capacitor $C_1$ is provided for reducing the impedance of each set output voltage so as to stabilize its potential level. Because of the effect of this capacitor $C_1$, there is a time gap since the switch control signal for triggering the potential change of the substrate potential $V_{sub}$ and the intermediate voltage $V_M$ is generated until the potentials are actually switched. In addition, each circuit element besides this capacitor also causes delay of the signal. Therefore, it is desirable to start to switch potentials in consideration with the above delay, and to stabilize the potentials by setting the time constant to a relatively larger value in response to the delay of the circuit.

The image signals obtained from the image sensing device 1 as described above are applied with predetermined processes in the pre-processor 5, the A/D converter 6 and the image signal processing circuit 7. Thereafter, the image signals are converted into signals with a specific format in the recording unit I/F 8 to be outputted as frame image signals. Finally, the image signals are recorded in the recording medium as a still image.

In the digital camera according to the first embodiment, an image is sensed in the field mode for a predetermined period then sensed in the frame mode, thus it is possible to sense the image in the frame mode at the best timing by turning the switch. Especially, in the digital camera according to the first embodiment, since the image signals obtained in the field mode are provided to the EVF 13 as well as image signals obtained in the frame mode are recorded in the recording medium 9, a still image of high resolution can be recorded in the recording medium 9 at the best timing. Furthermore, since the image sensing device 1 has a vertical overflow drain structure, electrical charges stored in the pixels 24 can be effectively drained to the silicon substrate.

Note, the substrate potential $V_{sub}$ is not necessarily set to the same potential as that in the field mode as far as stored electrical charges can be drained to the silicon substrate by setting the potential higher than that before time $t_4$. Further, the intermediate voltage $V_M$ after the time $t_5$ is not necessarily set to the same potential as that in the field mode as far as the quality of an image can be prevented from deterioration of an image caused by the low charge transfer efficiency, by setting the intermediate voltage higher than that before time $t_4$.

The even field is read out prior to the odd field in the first embodiment, however, the present invention is not limited to this, and it is possible to read out changes stored in the pixels in the vise-versa order.

Second Embodiment

Next, a second embodiment of the present invention will be described.

Figure 6:
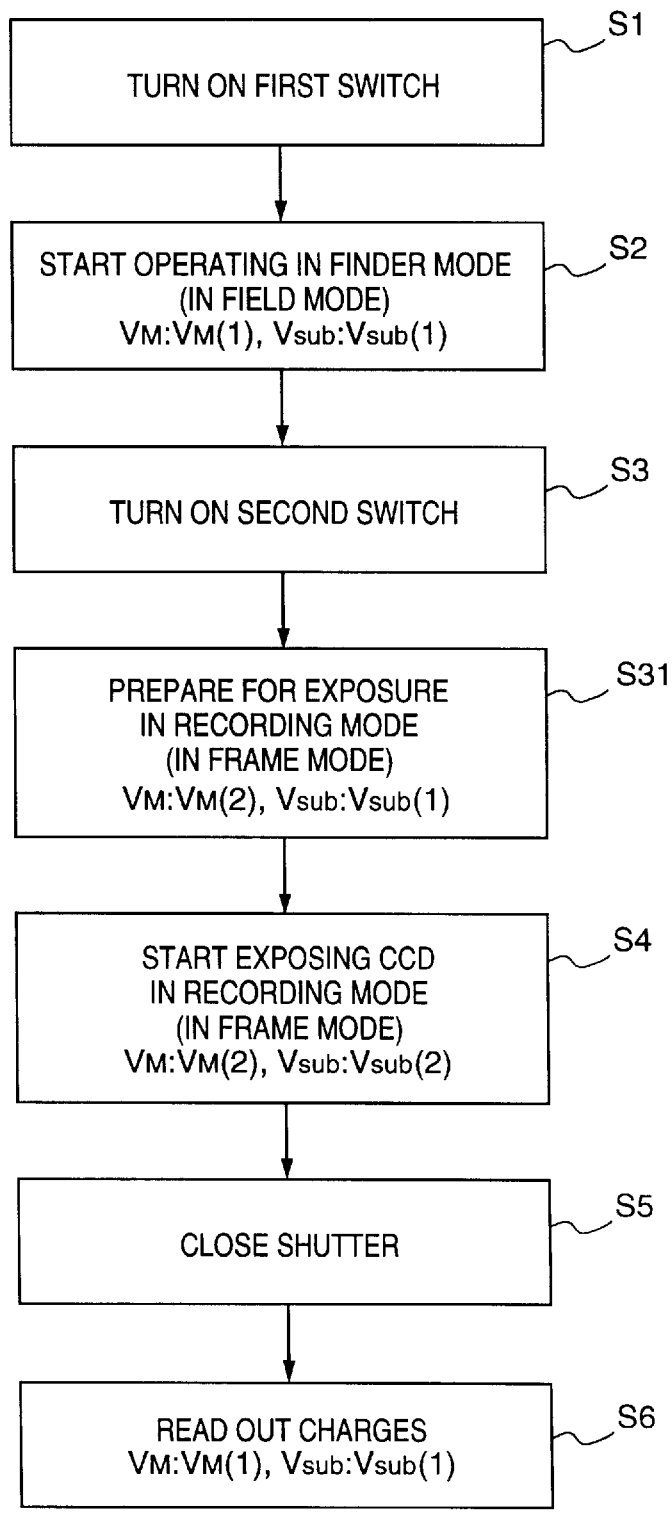
FIG. 6 is a flowchart for explaining an operation of an image sensing apparatus according to a second embodiment of the present invention.

FIG. 6 is a flowchart showing an image sensing processing sequence by using the digital camera of the second embodiment. The second embodiment differs from the first embodiment at the point in which the intermediate voltage $V_M$ is set to $V_M(2)$ and the substrate potential $V_{sub}$ is set to $V_{sub}(1)$ for a 1FP before exposing the image sensing device 1 as a preparation for exposure in the frame mode (step S31) after the second switch in the operating unit is turned on (step S3). By doing so, electrical charges are drained to the silicon substrate during preparation for exposure, thereby excess electrical charges which may flow into the VCCD from the pixels 24 can be reduced. Consequently, it is possible to prevent an image from deteriorating caused by the excess charges flowing into the VCCD 21 and being transferred.

Figure 7:
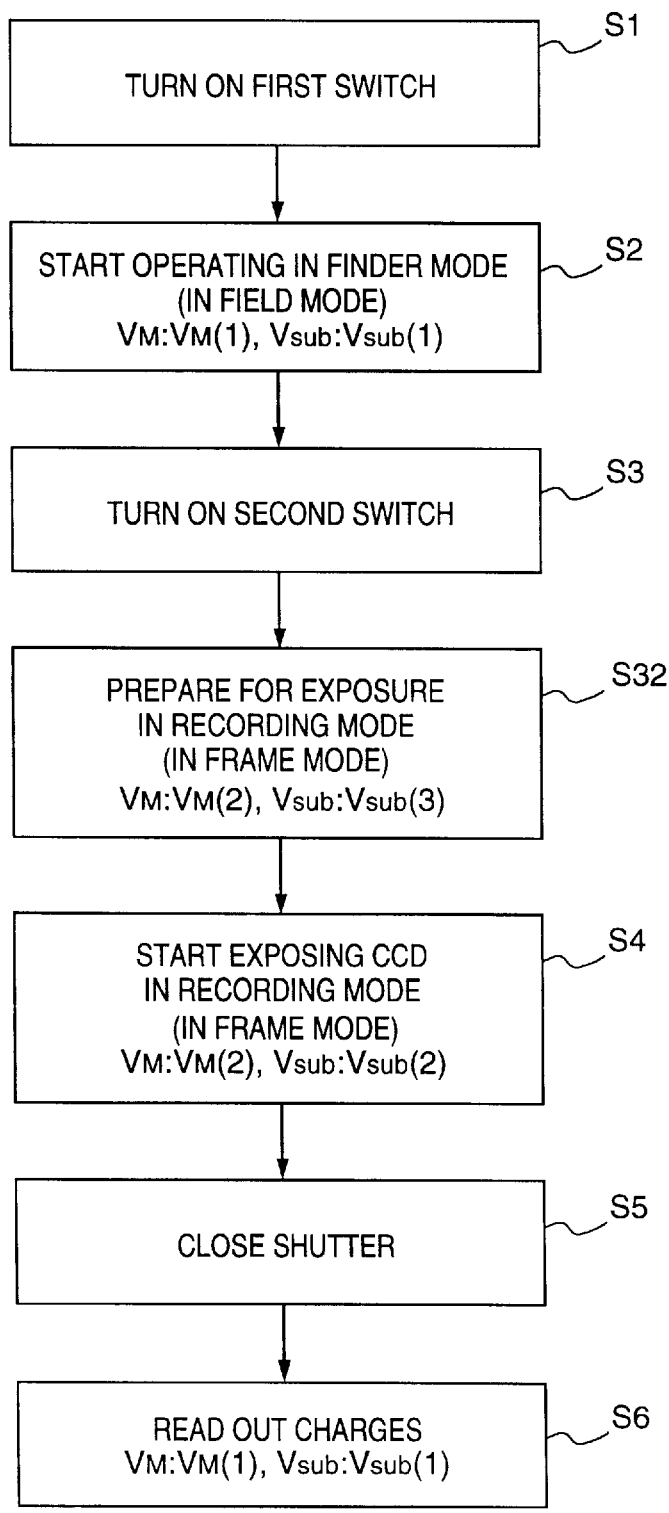
FIG. 7 is a flowchart for explaining an operation of an image sensing apparatus according to a modification of the second embodiment of the present invention.

Further, as shown in a flowchart shown in FIG. 7, after the second switch of the operating unit is turned on (step S3), the intermediate voltage $V_M$ may be set to $V_M(2)$ and the substrate potential $V_{sub}$ is set to a potential $V_{sub}(3)$ ($V_{sub}(3) > V_{sub}(1)$) for a 1FP before exposing the image sensing device 1 as a preparation for exposure in the frame mode (step S32). By doing so, electrical charges in the pixels 24 are surely drained into the silicon substrate, thus excess charges which may flow into the VCCD 21 during preparation for exposure from the pixels 24 are further reduced. As a result, it is possible to prevent an image from deteriorating caused by excess charges flowing into the VCCD 21 and being transferred more strictly.

Figure 8:
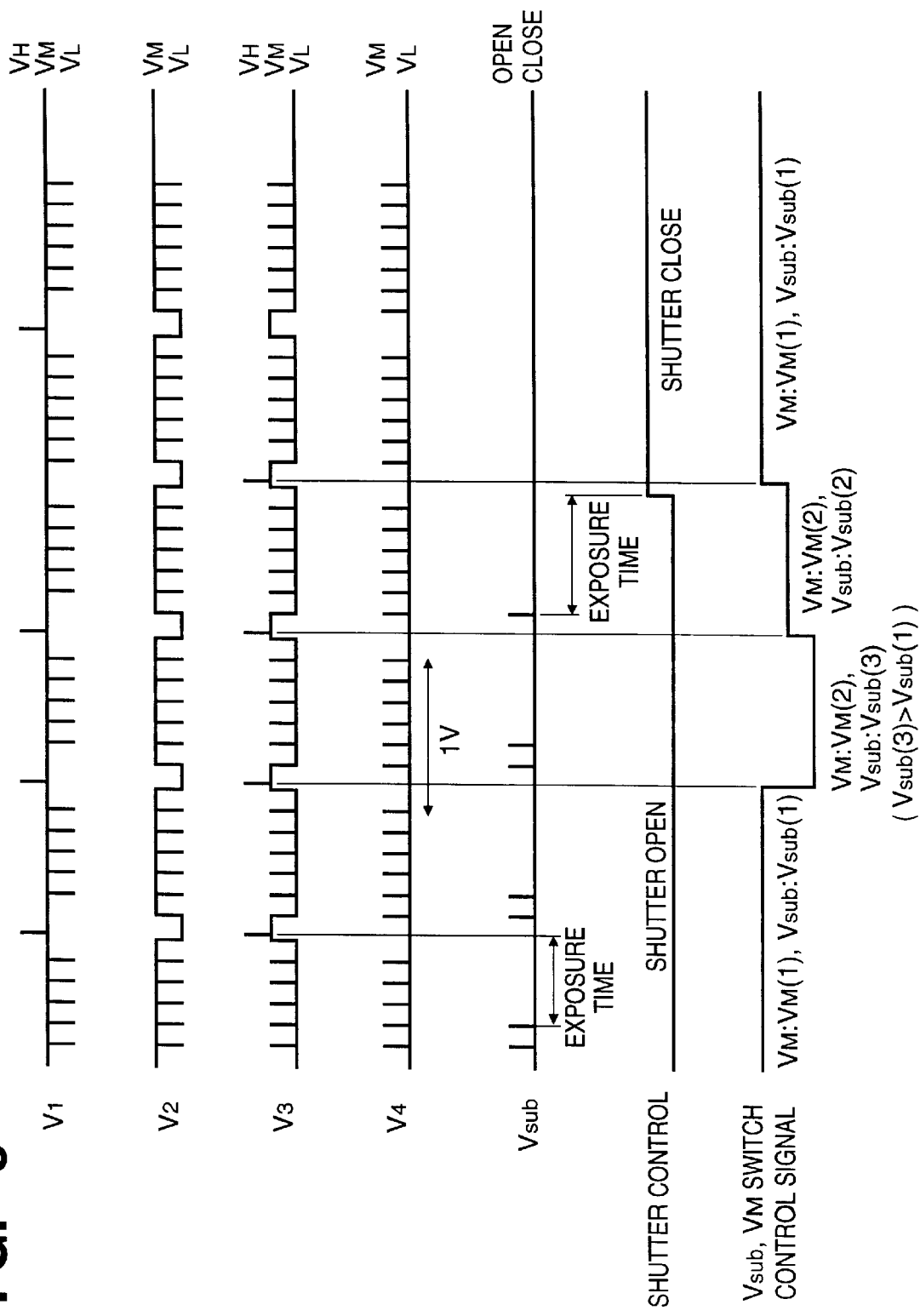
FIG. 8 is a timing chart for explaining an operation of the image sensing apparatus according to the second embodiment of the present invention.

FIG. 8 is a timing chart of signals in the sequence shown in FIG. 7. In this example, the dynamic range of the pixels 24 is narrower than the dynamic range in the field mode for the 1FP before the exposure, thus almost all the electrical charges corresponding to the high luminance part are drained into the silicon substrate. Accordingly, it is possible to prevent excess charges from flowing into VCCD 21 more precisely, and to prevent needless charges from remaining in the pixels 24.

Note, the timing to change potentials of the substrate and the charge transfer pulses during read-out operation is the same as in the first embodiment.

Third Embodiment

Next, a third embodiment is explained.

Figure 9:
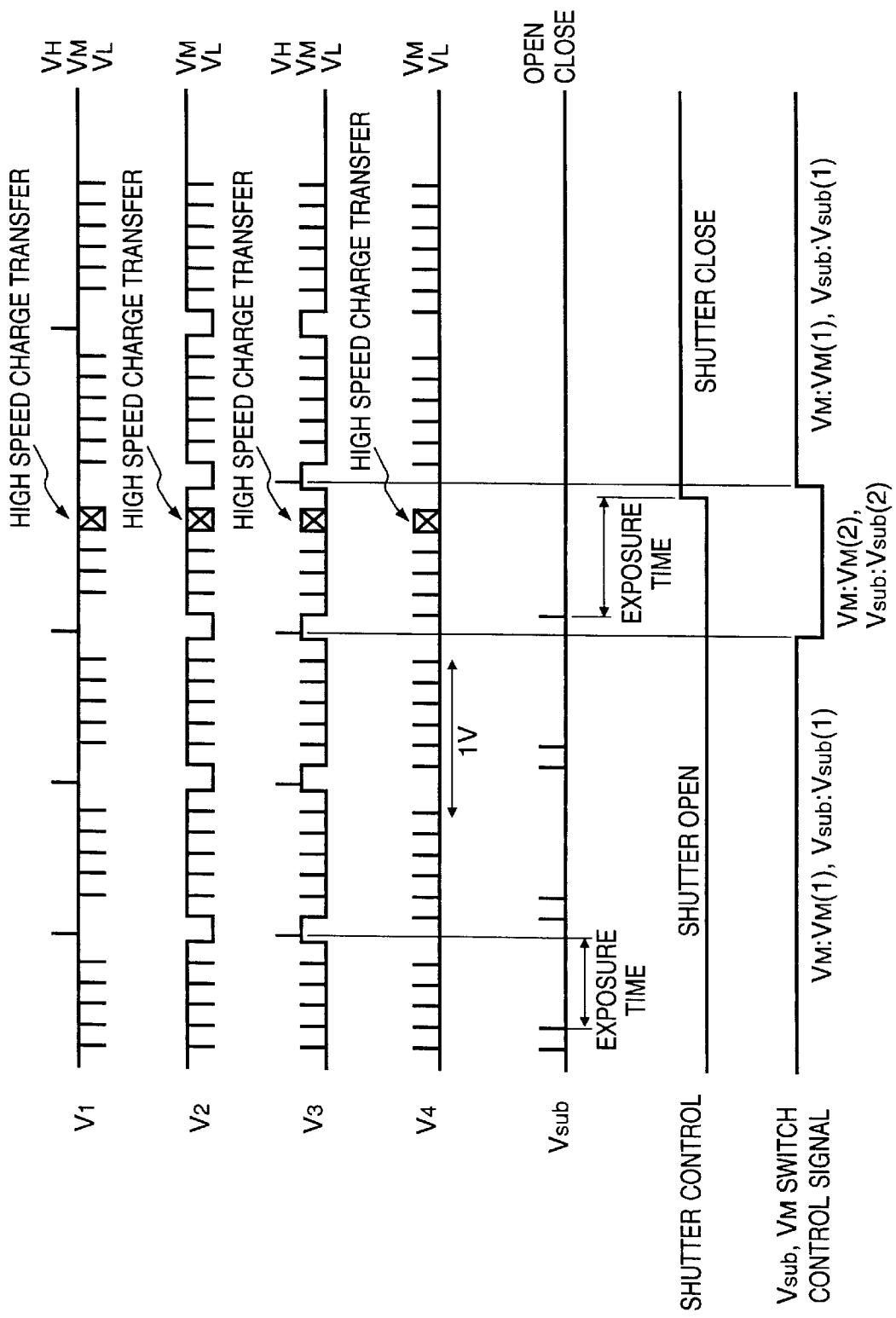
FIG. 9 is a timing chart for explaining an operation of an image sensing apparatus according to a third embodiment of the present invention.

FIG. 9 is a timing chart of signals to be applied to a digital camera of the third embodiment. In the third embodiment, the charge transfer pulses $V_1$ to $V_4$ are changed at a speed which is 20 times faster than the speed that the pulses are usually changed before changing the charge transfer pulse $V_3$ to the high voltage $V_H$. By doing so, it is possible to remove needless charges which flow into the VCCD 21 during an exposing period, thereby blooming problem will scarcely occurs.

Note, the timing to change potentials of the substrate and the charge transfer pulses during read-out operation is the same as in the first embodiment.

Fourth Embodiment

Next, a fourth embodiment of the present invention is described.

Figure 10:
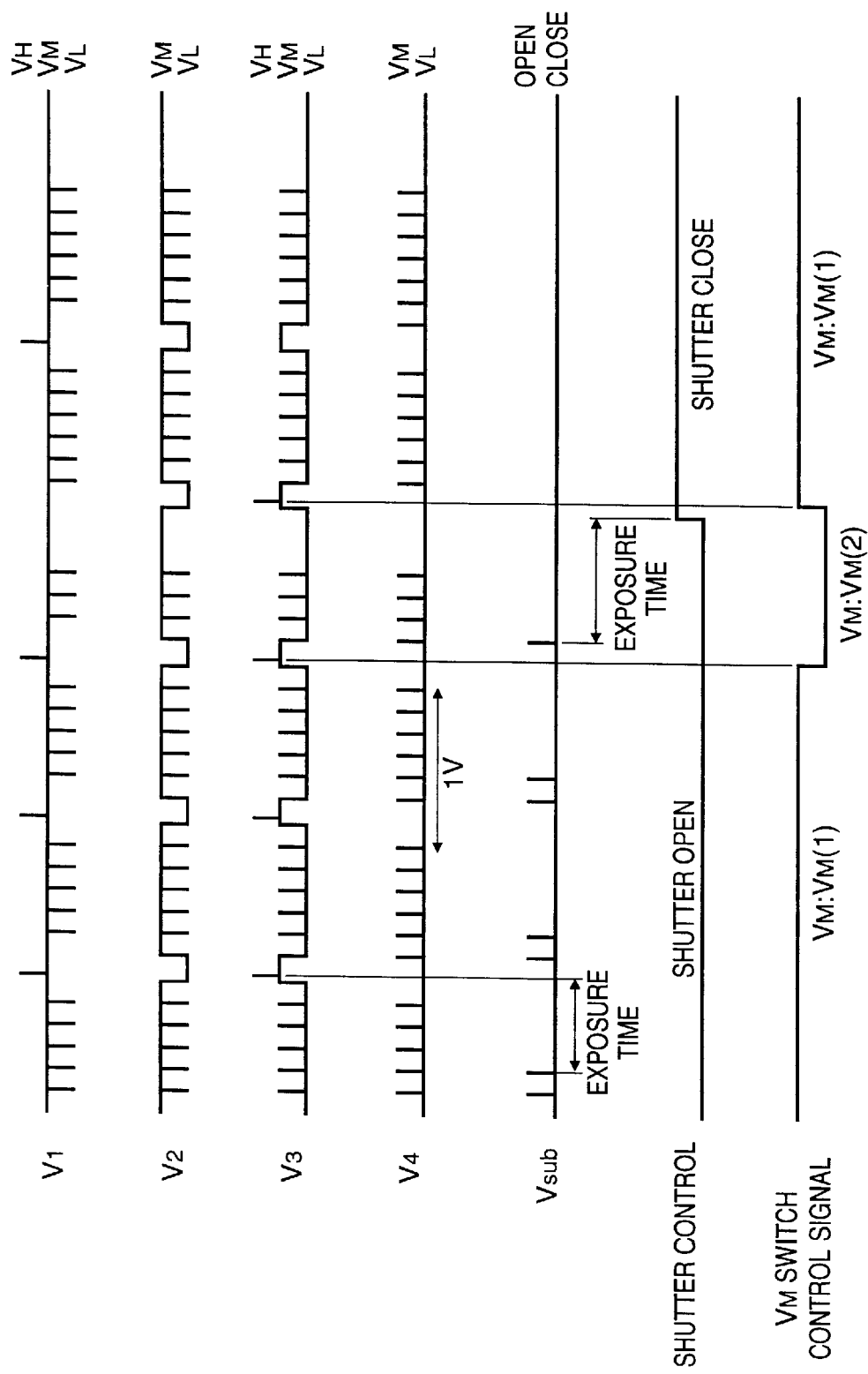
FIG. 10 is a timing chart for explaining an operation of an image sensing apparatus according to a fourth embodiment of the present invention.

FIG. 10 is a timing chart of signals to be applied to a digital camera of the fourth embodiment. In the fourth embodiment, the charge transfer pulses $V_1$ to $V_4$ are skipped for a predetermined time period for about 10 pulses just before the charge transfer pulse $V_3$ is changed to the high voltage $V_H$ after the frame mode is started. By doing so, the timing when the intermediate voltage $V_M$ has to be switched from $V_M(2)$ to $V_M(1)$ can be loosened. More specifically, by providing time for the intermediate voltage $V_M$ to switch until the charge transfer pulse $V_3$ is changed to the high voltage $V_H$ longer, it is possible to complete a process to switch the intermediate voltage $V_M$ before starting transferring electrical charges in the VCCD 21, even though a large value is selected as the time constant using the capacitor $C_1$ in the switching circuit shown in FIG. 5. As a result, it is possible to configure a low voltage circuit which has low impedance.

Note, the timing to change potentials of the substrate and the charge transfer pulses during read-out operation is the same as in the first embodiment.

According to the first to fourth embodiment as described above, it is possible to provide an inexpensive image sensing apparatus capable of improving dynamic range, when a still image is sensed in the frame mode, to the width as in the field mode, realizing high charge transfer efficiency, and not causing deterioration of an image because of blooming.

The object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A method of controlling an image sensing device, which includes a photoelectric converter made of a plurality of photoelectric converting elements formed on a substrate of a semiconductor, a vertical charge transfer unit for transferring charges read out from the photoelectric converter in a single direction by applying pulses having high potential, intermediate potential, and low potential, where the high potential is higher than the low potential and the intermediate potential is in between the high potential and the low potential, and a horizontal charge transfer unit for transferring charges sent from the vertical charge transfer unit in the direction perpendicular to the charge transfer direction of the vertical charge transfer unit, and which can be operated in a field mode in that image signals are obtained after adding charges stored in pixels by two adjoining lines and in a frame mode in that image signals are obtained by interlace scanning, by controlling a potential of a substrate and the intermediate potential of the pulses when the image sensing device is scanned in the frame mode, said method comprising:

a setting step of setting the potential of the substrate to a first potential and the intermediate potential to a second potential;

a first changing step of changing the intermediate potential to a third potential which is higher than the second potential during reading a first field of the image sensing device;

a second changing step of changing the potential of the substrate to a fourth potential which is higher than the first potential; and a second field read-out step of reading out charges stored in a second field and transfer them vertically after all charges read out from the first field have transferred.

2. The method according to claim 1, wherein, in said second changing step, timing to change the potential of the substrate is during the charges stored in the first field are read-out and after said first changing step.

3. The method according to claim 1, wherein, in said second changing step, timing to change the potential of the substrate has to reside in a period since the charges in the first field start being read out until charges in the second field start being read out, and before a level of the charge in the second field passes a predetermined value.

4. The method according to claim 3, wherein said predetermined value is a value at which the level of the charges stored in the second field exceeds a potential wall formed in accordance with the intermediate potential.

5. The method according to claim 1, wherein the fourth potential to which the potential of the substrate is changed at said second changing step and the third potential of the intermediate potential are equal to a potential of the substrate and an intermediate potential in the field mode, respectively.

6. The method according to claim 1, wherein the photoelectric converting elements in the first field which form horizontal lines saturate more frequently than the photoelectric converting elements in the second field.

7. The method according to claim 1, further comprising a light blocking step of blocking light incoming toward the image sensing device after starting storing charges in the pixels before starting reading the first field by using a light blocking means which is provided in front of the image sensing device.

8. The method according to claim 1, further comprising an image sensing step of sensing an image in the field mode for a predetermined period before starting sensing an image in the frame mode, wherein image signals obtained at said image sensing step are outputted to a finder so as to be used to check states of the object.

9. The method according to claim 1, further comprising a draining step of draining charges into the substrate by setting the potential of substrate to the fourth potential and the intermediate potential to the second potential before starting sensing an image in the frame mode.

10. The method according to claim 1, further comprising a high speed transfer step of removing charges flown into the vertical charge transfer unit before starting reading the first field.

11. A method of controlling an image sensing device, which includes a photoelectric converter made of a plurality of photoelectric converting elements formed on a substrate of a semiconductor, a vertical charge transfer unit for transferring charges read out from the photoelectric converter in a single direction by applying pulses having high potential, intermediate potential, and low potential, where the high potential is higher than the low potential and the intermediate potential is in between the high potential and the low potential, and a horizontal charge transfer unit for transferring charge sent from the vertical charge transfer unit in the direction perpendicular to the charge transfer direction of the vertical charge transfer unit, and which can be operated in a field mode in that image signals are obtained after adding charges stored in pixels by two adjoining lines and in a frame mode in that image signals are obtained by interlace scanning, by controlling a potential of a substrate and the intermediate potential of the pulses when the image sensing device is scanned in the frame mode, said method comprising:

a setting step of setting the potential of the substrate to a first potential and the intermediate potential to a second potential;

a pulse skipping step of skipping pulses for a predetermined period before starting reading a first field of the image sensing device;

a first changing step of changing the intermediate potential to a third potential which is higher than the second potential;

a second changing step of changing the potential of the substrate to a fourth potential which is higher than the first potential; and a second field read-out step of reading out charges stored in a second field and transfer them vertically after all charges read out from the first field have transferred.

12. An image sensing apparatus comprising:

an image sensing device which can be operated in a field mode in that image signals are obtained by adding charges stored in pixels by two adjoining lines and in a frame mode in that image signals are obtained by interlace scanning, having:

a photoelectric converter made of a plurality of photoelectric converting elements formed on a substrate of a semiconductor;

vertical charge transfer means for transferring charges read out from said photoelectric converter in a single direction; and horizontal charge transfer means for transferring charges sent from said vertical charge transfer means in the direction perpendicular to the charge transfer direction of said vertical charge transfer means;

switching means for switching between the field mode and the frame mode;

pulse generation means for generating pulses having high potential, intermediate potential, and low potential to be applied to said vertical charge transfer means, where the high potential is higher than the low potential and the intermediate potential is in between the high potential and the low potential;

first setting means for setting a potential of the substrate either to a first potential or to a second potential which is higher than the first potential;

second setting means for setting the intermediate potential either to a third potential or to a fourth potential which is higher than the third potential; and setting switch means for issuing an instruction to change the potential of the substrate and the intermediate potential.

13. The image sensing apparatus according to claim 12, wherein said setting switch means designates to change the intermediate potential from the third potential to the fourth potential and to change the potential of the substrate from the first potential to the second potential during a first field of the image sensing device is read out in the frame mode.

14. The image sensing apparatus according to claim 13, wherein said setting switch means designates to change the potential of the substrate from the first potential to the second potential after the intermediate potential has already changed to the fourth potential.

15. The image sensing apparatus according to claim 12, wherein said setting switch means designates to change the potential of the substrate from the first potential to the second potential during a period since charges stored in a first field of the image sensing device start being read out until charges in a second field of the image sensing device start being read out, and before a level of a stored charge in the second field exceeds a predetermined value.

16. The image sensing apparatus according to claim 15, wherein said predetermined value is a value at which the level of the charges stored in the second field exceeds a potential wall formed in accordance with the intermediate potential.

17. The image sensing apparatus according to claim 12, wherein the second potential of the substrate and the fourth potential of the intermediate potential are equal to a potential of the substrate and an intermediate potential in the field mode, respectively.

18. The image sensing apparatus according to claim 12, wherein the photoelectric converting elements in the first field which form horizontal lines saturate more frequently than the photoelectric converting elements in the second field.

19. The image sensing apparatus according to claim 12, further comprising light blocking means for blocking light incoming toward said image sensing device.

20. The image sensing apparatus according to claim 12, further comprising recording means for recording image signals obtained in the frame mode in a recording medium.

21. The image sensing apparatus according to claim 20, further comprising a finder for outputting image signals obtained by sensing an image in a field mode for a predetermined period before starting sensing an image in the frame mode.

22. The image sensing apparatus according to claim 12, wherein said image sensing device has a vertical overflow drain structure.

23. The image sensing apparatus according to claim 12, wherein said setting switch means designates to set the potential of the substrate to the second potential and the intermediate potential to the third potential so as to drain charges in pixels into the substrate before starting sensing an image in the frame mode.

24. The image sensing apparatus according to claim 12, wherein said setting switch means designates said pulse generating means so as to remove charges flown into said vertical transfer means at high speed before starting reading charges out of the first field.

25. The image sensing apparatus according to claim 12, wherein said pulse generating means skips generating pulses which were to be applied to said vertical charge transfer means before starting reading charges out of the first field.

* * * * *